(12) United States Patent
Ritter et al.

(10) Patent No.: US 9,860,136 B2
(45) Date of Patent: Jan. 2, 2018

(54) PROVIDING NETWORK CONGESTION INFORMATION TO MOBILE DEVICES FOR SPONSORED DATA

(71) Applicants: Verizon Patent and Licensing inc., Arlington, VA (US); Cellco Partnership, Arlington, VA (US)

(72) Inventors: Phillip A. Ritter, Danville, CA (US); Chris S. Neisinger, Danville, CA (US); Barry F. Hoffner, Bridgewater, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 721 days.

(21) Appl. No.: 14/256,676

(22) Filed: Apr. 18, 2014

(65) Prior Publication Data
US 2015/0195150 A1 Jul. 9, 2015

Related U.S. Application Data

(60) Provisional application No. 61/924,701, filed on Jan. 7, 2014.

(51) Int. Cl.
*G06F 15/173* (2006.01)
*H04L 12/24* (2006.01)
(Continued)

(52) U.S. Cl.
CPC ...... *H04L 41/5029* (2013.01); *H04L 12/1403* (2013.01); *H04L 12/1475* (2013.01); *H04L 12/1485* (2013.01); *H04M 15/8016* (2013.01); *H04M 15/8027* (2013.01); *H04M 15/8044* (2013.01); *H04M 15/8055* (2013.01); *H04M 15/8083* (2013.01); *H04W 28/0247* (2013.01); *H04W 28/0263* (2013.01);
(Continued)

(58) Field of Classification Search
CPC .......... H04L 47/2441; H04M 15/8061; H04M 2215/0192
See application file for complete search history.

(56) References Cited

U.S. PATENT DOCUMENTS 9,426,305 B2* 8/2016 De Foy ............... H04L 12/1478
2007/0060099 A1* 3/2007 Ramer ............. G06F 17/30867
455/405

(Continued)

*Primary Examiner* — Moustafa M Meky
*Assistant Examiner* — Andrea Hurst (57) ABSTRACT

A third-party application, executing at a mobile device, may be provided with information describing congestion levels in a network, such as a cellular wireless network through which the mobile device connects. In one implementation, the third-party application may select, based on the information describing the congestion levels, a data flow, from a number of data flows, to use when communicating with a destination device, each of the data flows being associated with different quality of service (QoS) parameters and being associated with different charging rates. The mobile device may communicate, through a proxy server, and using the selected data flow, with the destination device. The communication with the destination device may be implemented using sponsored data that is not charged to an account associated with an owner of the mobile device.

18 Claims, 8 Drawing Sheets

(51) Int. Cl.
*H04W 40/12* (2009.01)
*H04W 28/02* (2009.01)
*H04L 12/14* (2006.01)
*H04M 15/00* (2006.01)
*H04L 12/851* (2013.01)

(52) U.S. Cl.
CPC ... *H04W 28/0268* (2013.01); *H04W 28/0284* (2013.01); *H04W 40/12* (2013.01); *H04L 47/2441* (2013.01); *H04M 15/8061* (2013.01); *H04M 2215/0192* (2013.01)

(56) References Cited

U.S. PATENT DOCUMENTS

| | | | |
|---|---|---|---|
| 2008/0009268 A1* | 1/2008 | Ramer | G06F 17/30867 455/412.1 |
| 2010/0030740 A1* | 2/2010 | Higgins | G06F 17/30241 715/762 |
| 2012/0294195 A1* | 11/2012 | Raleigh | G06Q 10/06375 370/259 |
| 2013/0132854 A1* | 5/2013 | Raleigh | G06F 3/0482 715/738 |
| 2015/0019746 A1* | 1/2015 | Shatzkamer | H04L 65/1069 709/228 |
| 2015/0044989 A1* | 2/2015 | De Foy | H04L 12/1478 455/406 |
| 2016/0253342 A1* | 9/2016 | Ramer | G06Q 30/02 |

* cited by examiner

| Developer | Red Light QCI-8 | Green Light QCI-9 |
|---|---|---|
| Developer1 | 10GB | 40GB |
| Developer2 | 5GB | 25GB |
| ... | ... | ... |

PROVIDING NETWORK CONGESTION INFORMATION TO MOBILE DEVICES FOR SPONSORED DATA

RELATED APPLICATIONS

The present application claims the benefit of U.S. Provisional Patent Application No. 61/924,701, titled "CELL SITE CONGESTION COORDINATION FOR SPONSORED DATA," which was filed on Jan. 7, 2014, and which is hereby incorporated by reference as though fully set forth herein.

BACKGROUND

Wireless networks, such as cellular wireless networks, may provide network connectivity to mobile devices, such as smart phones. Wireless networks are increasingly becoming data-centric networks that are used for data-intensive applications.

Cell sites in a wireless network can become congested. For example, during peak usage periods, a base station, which may provide wireless connectivity to mobile devices connected to the cell site, may experience a high load of the radio resources (e.g., the radio spectrum used by the base station may be near maximum capacity) or of the computing resources of the base station. Accordingly, it may be desirable for applications that transmit data over wireless networks to transmit the data during non-peak usage periods. Network operators may be willing to charge reduced data rates for data transmissions during non-peak usage periods.

Some applications, when installed by a user at a mobile device, may communicate with the wireless network such that data may be paid for by a party other than the user of the mobile device. For example, the application developer or distributor of a particular application (called a "third-party application herein") may be responsible for any charges, that are charged by the network operator, for data transmitted or received by the third-party application. In this situation, the data may be thought of as "sponsored data" that is toll-free for the user of the mobile device.

DETAILED DESCRIPTION OF PREFERRED EMBODIMENTS

The following detailed description refers to the accompanying drawings. The same reference numbers in different drawings may identify the same or similar elements.

Techniques described herein may provide a third-party application, executing at a mobile device, with information describing congestion levels in a network, such as a cellular wireless network through which the mobile device connects. For example, a server or other device associated with the network may determine the congestion levels and transmit indications of the congestion levels to the third-party application. In one implementation, the information describing the congestion levels in the network may be a binary indication of whether the congestion level is off-peak (called "green light" congestion status or "congestion valley" status) or peak (called "red light" congestion status, "non-valley" status, "peak" status, or "not off-peak" status). The third-party application may determine, based on the information describing the congestion levels, whether to communicate with the network. For example, during off-peak periods, the third-party application may be charged a reduced rate for bandwidth usage and during other periods the third-party application may be charged a higher rate (e.g., a "normal" rate or "peak" rate) for bandwidth usage. The third-party application can thus make an informed decision of whether to transmit/receive data.

In one implementation, communications made by the third-party application may be made through a proxy server. Two bearer flows may be maintained between the third-party application and the proxy server: a higher priority (but potentially more costly) data flow and a lower priority (but potentially less costly) data flow. Usage of the lower priority data flow may be charged at a reduced rate and usage of the higher priority data flow may be charged at a higher or normal rate. The third-party application, based on the information indicating whether the current network state is a peak period or an off-peak period, may choose which data flow to use. Thus, in accordance with some implementations, during peak periods, the third-party application may thus choose to use the higher priority data flow (and be charged the higher rate for the data). On the other hand, during off-peak periods, the third-party application may choose to use the lower priority flow (and be charged the reduced rate for the data). Usage of the lower priority flow in peak periods may result in loss of the data (e.g., by dropping of the data by the proxy server, dropping of the data by another portion of the network, etc.).

Figure 1:
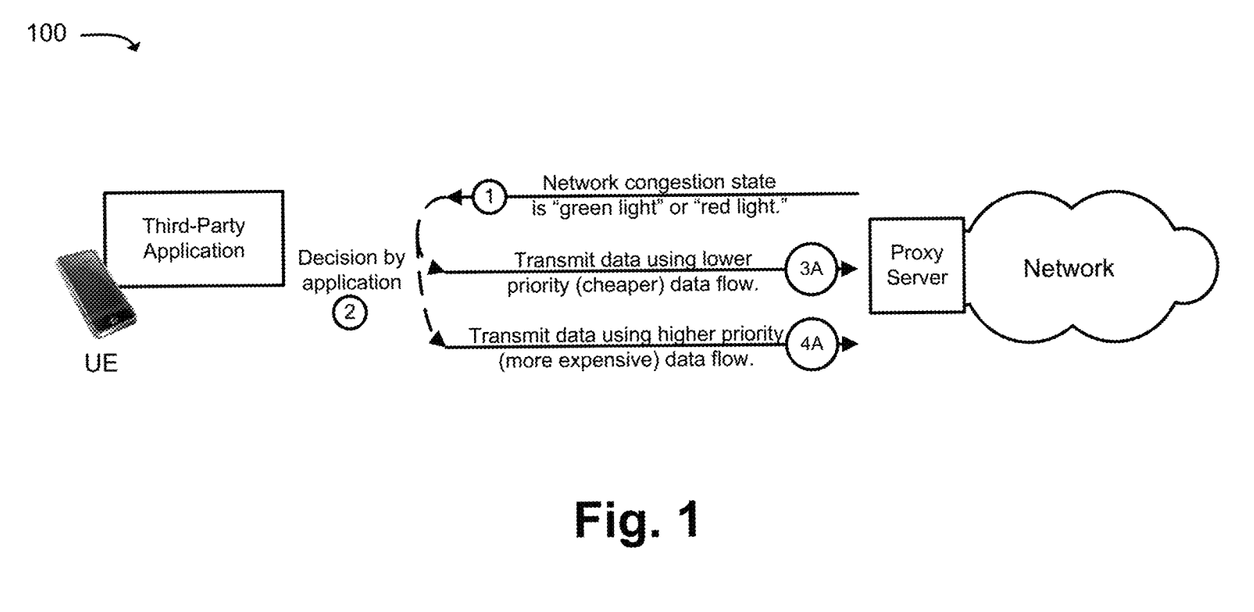
FIG. 1 is a diagram illustrating an example of an overview of concepts described herein.

FIG. 1 is a diagram illustrating an example of an overview of concepts described herein. As shown in FIG. 1, a mobile device (illustrated as user equipment ("UE") in FIG. 1), such as a smart phone, tablet, or other mobile communication device, may include one or more applications, such as applications installed by a user of the UE. The applications may include an application that communicates with a network, such as a cellular wireless network, using sponsored data that is not charged to the account associated with the user. For example, if the user has an account with a network service provider that permits a limited amount of data to be transmitted or received by the user's UE, data communicated by the application may not be counted against the limit. In this example, the application is illustrated as a "third-party application." Instead of charging the user of the application, the application developer, or another entity, may be charged by the network service provider for the data.

A proxy server is also illustrated in FIG. 1. The proxy server may include one or more devices that act as a communication gateway for data flows used by the third-party application. The proxy server may perform accounting and aggregation services relating to an amount of data used by the third-party application. For example, a particular developer may develop an application that is marketed as a sponsored data application in which users that install the application are not charged for data used by the application. The proxy server may monitor the total traffic used by the application (e.g., by all users that have installed the application) and forward the usage information to a billing server, or other computing device, for eventual billing of the particular developer.

As shown in FIG. 1, the third-party application may receive, such as from the proxy server, information relating to the network congestion state of the network. The congestion information may be provided to the third-party application in real-time or near real-time. In this example, the congestion information is provided to the third-party application in a binary format, in which the network is either indicated as not congested ("green light") or congested ("red light") (arrow "1", "Network congestion state is 'green light' or 'red light'").

Based on the received congestion information, the third-party application may make a decision to transmit data and may choose the service level of the transmitted data (arrow "2", "Decision by application"). As mentioned, in one implementation, the third-party application may be given the option of transferring data using two possible quality of service data flows: a higher priority data flow and a lower priority data flow. Each of the two data flows may be associated with charging information that is based on the congestion state of the network. For example, the lower priority data flow may be a "scavenger class" data flow in which no particular guarantee is made, by the network service provider, as to the delivery of the data flow. A scavenger class data flow may be effectively unusable during peak congestion periods (e.g., packets in the data flow may be frequently or always dropped by the network). The higher priority data flow may be a data flow that is associated with "best effort" traffic. The higher priority data flow may generally be charged at a higher rate than the lower priority data flow. In one example, during the red light network congestion state, the higher priority data flow may be charged at a premium to the lower priority data flow. During the green light network congestion state, however, the second data flow may be charged at a slight premium to the first dataflow and/or at the same price. In this manner, the third-party application, and hence the application developer, can decide the most appropriate data flow to use based on the network congestion state. For instance, the third-party application may transmit data using the lower priority (cheaper) data flow when the congestion state is green light (arrow "3A") but may transmit data using the higher priority (more expensive) data flow when the congestion state is red light (arrow "3B").

The higher priority and lower priority data flows may both be transmitted through or monitored by the proxy server. The proxy server may be maintained by, for example, the telecommunications provider associated with the network. The proxy server may thus maintain usage and or billing information relating to the data flows used by the particular third-party application.

Figure 2:
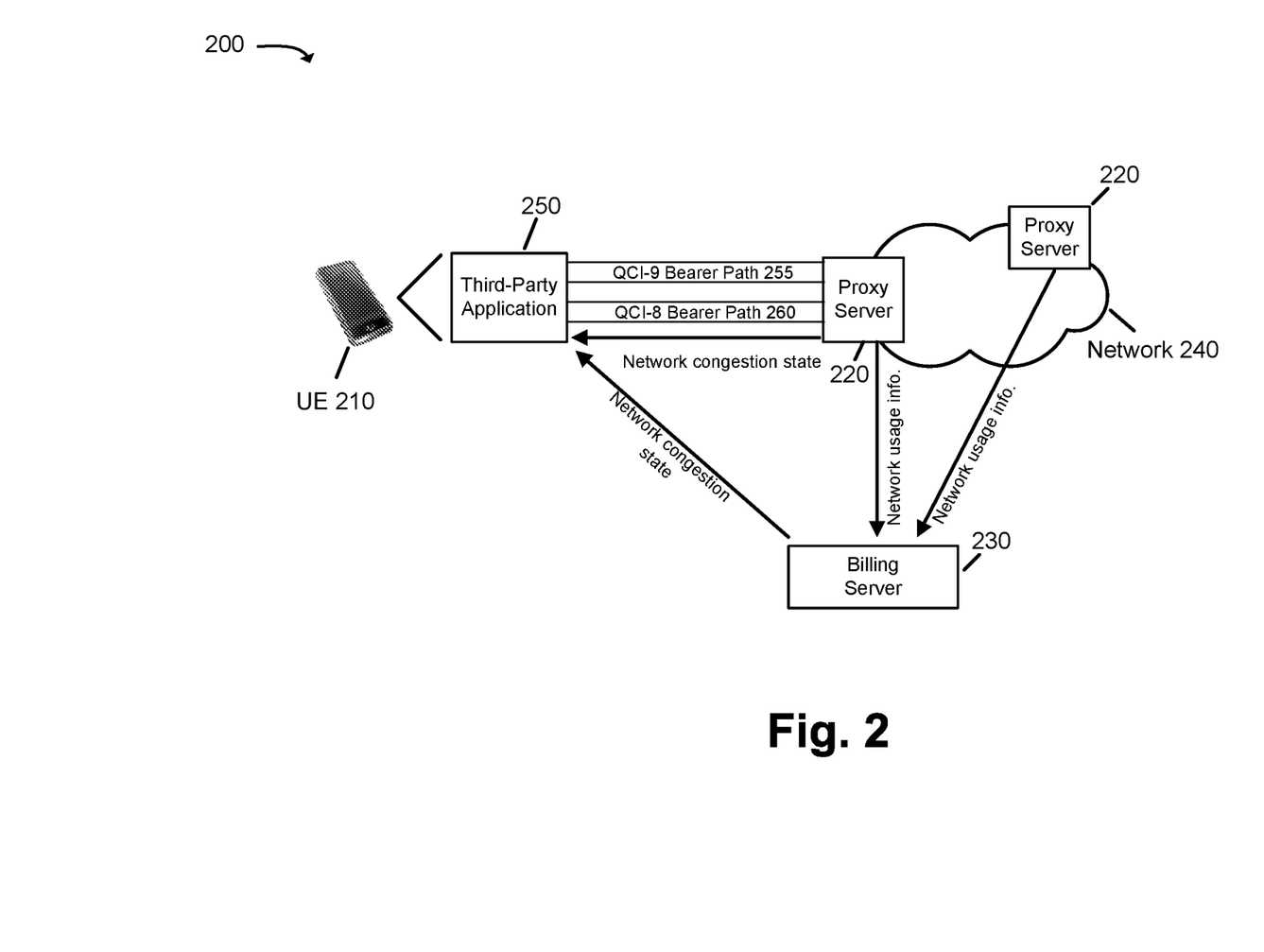
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include UE 210, one or more proxy servers 220, and billing server 230. Proxy servers 220 and billing server 230 may be associated with network 240. UE 210 may connect to network 240 using a wireless (e.g., a cellular wireless or other wireless) interface.

UE 210 may include a portable communication device that is capable of connecting to network 240. UE 210 may include a smart phone, a personal digital assistant ("PDA"), a laptop computer, a desktop computer, a tablet computer; or another type of computation and communication device. UE 210 may include a radio interface designed to connect to network 240. The radio interface may include a cellular wireless interface.

UE 210 may additionally be associated with an application, illustrated as third-party application 250. Third-party application 250 may be an application that communicates with one or more other devices (e.g., servers, other UEs, etc.) using sponsored data that is not charged to the account of the user of UE 210. Instead, charges relating to network usage, by third-party application 250, may be charged to a developer or distributor of third-party application 250 (or another entity).

Proxy server 220 may include one or more devices that act as an intermediary server for third-party application 250. Packet flows associated with third-party application 250 may be passed through proxy server 220. For example, a developer of third-party application 250 may agree, that in order to potentially obtain a reduced data rate, all communications by third-party application 250 may be passed through proxy server 220. Proxy server 220 may forward outgoing data (i.e., from third-party application 250) towards a destination device and may transmit inbound data, that is destined for third-party application 250, towards third-party application 250. In this manner, proxy server 220 may be "aware" of all the data that is used by third-party application 250.

Bearer paths (e.g., data connections) with network 240 may be made by UE 210 when communicating via network 240. In one implementation, different applications, such as third-party application 250, may be associated with different packets flows and/or different service data paths that may be carried by the bearer paths. As particularly illustrated in FIG. 2, third-party application 250 may connect to proxy server 120 using at least two packets flows, a packet flow that is associated with a QCI-9 (Quality of Service (Qos) Class Identifier) bearer path 255 and packet flow that is associated with a QCI-8 bearer path 260. QCI-9 bearer path 255 and QCI-8 bearer path 160 may each be class 3 APN (access point name) connections. Under the QCI scheme, higher numbered levels may indicate lower quality of service. Thus, QCI-9 bearer path 255 may be given lower priority, by the network, than QCI-8 bearer path 260. QCI-9 bearer path 255 may be for "scavenger class" traffic that is only useable during off-peak congestion valley periods. QCI-8 bearer path 260 may be useable effectively during peak periods and may be given "best effort" QoS treatment. During peak periods, third-party application 250 may thus choose to use packet flows associated with QCI-8 bearer path 260 (and be charged the higher rate for the data). During off-peak periods, the third-party application may choose to use packet flows associated with QCI-9 bearer path 255 (and be charged the reduced rate for the data).

Although third-party application 250 will be generally described herein as being given the option of communicating via a QCI-8 and QCI-9 packet flows, in alternative implementations, packet flows may be associated with bearer paths having other QCI levels or other distinguishing characteristics.

Billing server 230 may include one or in more devices that aggregate information regarding data usage associated with application developers or providers, such as an application developer or provider associated with third-party application 250. Based on the information stored by billing server 230, the telecommunications provider associated with network 240 may be appropriately bill corresponding application developers or providers.

As shown in FIG. 2, in some implementations, billing server 230 and/or proxy server 220 may act to determine network congestion levels and provide applications, such as third-party application 250, with an indication of the current network congestion state ("Network congestion state"). The network congestion state information may be provided in real-time or near real-time and may be obtained by proxy server 220, billing server 230, or from one or more other network elements of network 240 (e.g., routers, base stations, gateways, or other network devices). In this manner, third-party application 250 may make real-time decisions on whether to use QCI-9 bearer path 255, QCI-8 bearer path 260, or whether to refrain from transmitting or requesting data. As mentioned above, in one implementation, the congestion state may provided as a binary indication of whether network 240 is off-peak ("green light") or congested ("red light"). Network congestion state information may be obtained from one or more network devices associated with network 240, such as routers, base stations, gateways, or other network devices.

Although proxy server 220 and billing server 230 were described as "servers" above, proxy server 220 and billing server 230 may correspond to a traditional server, a cloud-based service, a cluster of blade or rack-mounted servers, or another implementation that provides services and/or data storage.

Network 240 may include one or more networks that provide wireless network connectivity to UE 210. For example, network 240 may represent a wireless network that provides cellular wireless coverage. In some implementations, network 240 may be associated with an evolved packet system ("EPS") that includes a Long Term Evolution ("LTE") network and/or an evolved packet core ("EPC") network that operate based on a Third Generation Partnership Project ("3GPP") wireless communication standard. A radio access network (RAN) associated with wireless network 240 may include one or more base stations, some or all of which may take the form of an evolved node B ("eNB").

As is further shown in FIG. 2, proxy servers 220 may, at various times, transmit the network usage information, associated with third-party application 250 (and other third-party applications 250) to billing server 230 ("Network usage information"). Billing server 230 may aggregate and provide the usage information to an operator of network 240. Alternatively or additionally, the operator of billing server 230 may directly bill the application developers or providers of third-party applications 250.

In environment 200, as illustrated in FIG. 2, third-party application 250, executing at UE 210 may allow for toll-free data and/or voice usage by the user of UE 210. Third-party application 250 may be able to intelligently make the data and/or voice usage decisions based on the real-time network congestion state. The decision relating to the efficient use of network resources may be placed in the hands of the developer of third-party application 250.

Figure 3:
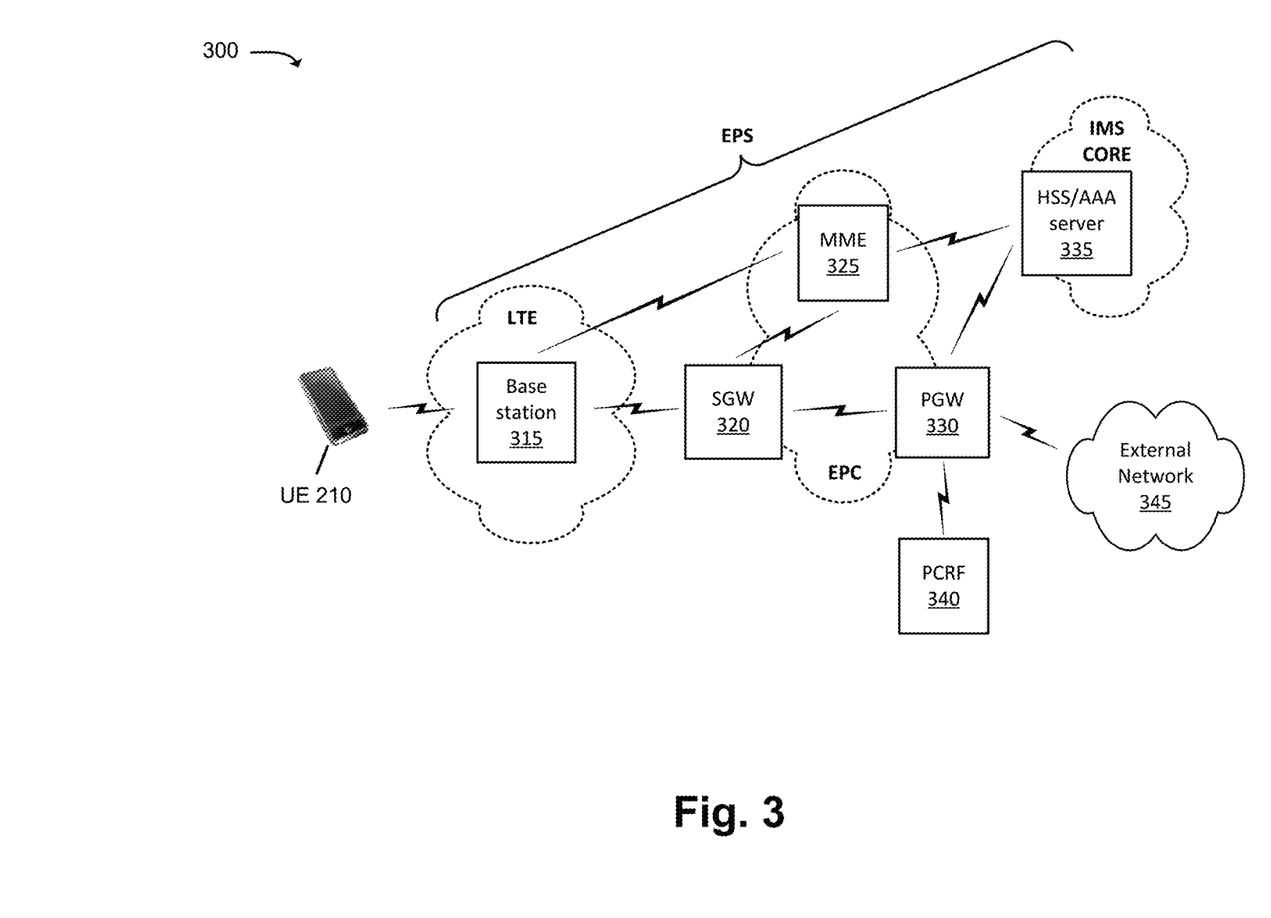
FIG. 3 illustrates an example implementation of a wireless network in which systems and/or methods described herein may be implemented.

FIG. 3 illustrates an example implementation of a wireless network 300 in which systems and/or methods described herein may be implemented. Wireless network 300 may correspond to a system in which environment 200 is implemented. In this particular example, wireless network 300 may correspond to an LTE/EPS cellular network. In other implementations, wireless network 300 may be implemented using other types of networks. While not explicitly shown in this figure, proxy servers 220 and billing server 230 may be implemented as part of the LTE/EPS network or as an external component (e.g., as part of external network 345).

As shown in FIG. 3, wireless network 300 may include base station 315, serving gateway ("SGW") 320, mobility management entity device ("MME") 325, packet data network ("PDN") gateway ("PGW") 330, home subscriber server ("HSS")/authentication, authorization, accounting ("AAA") server (hereinafter referred to as "HSS/AAA server") 335, policy charging and rules function ("PCRF") 340, and external network 345.

Wireless network 300 may include an EPS system that includes a LTE network and/or an EPC network that operate based on a third generation partnership project ("3GPP") wireless communication standard. The LTE network may be, or may include, a radio access network ("RAN") that includes one or more base stations 315, some or all of which may take the form of an eNodeB ("eNB"). The EPC network may include one or more SGWs 320, MMEs 325, and/or PGWs 330, that may communicate with external network 345 and/or an Internet protocol ("IP") multimedia subsystem ("IMS") core network. The IMS core network may include HSS/AAA server 335, and may manage authentication, session initiation, account information, a user profile, etc. associated with UE 210.

Base station 315 may include one or more network devices that receive, process, and/or transmit traffic, such as calls, audio, video, text, television programming content, and/or other data, destined for and/or received from UE 210. In one example, base station 315 may be an eNB device and may be part of the LTE network. Base station 315 may receive traffic from and/or send traffic to external network 345 via SGW 320 and PGW 330. Base station 315 may send traffic to and/or receive traffic from UE 210 via an air interface.

SGW 320 may include one or more network devices that gather, process, search, store, and/or provide information. For example, SGW 320 may include a gateway, a router, a modem, a switch, a firewall, a network interface card ("NIC"), a hub, a bridge, a proxy server, or some other type of device that processes and/or transfers traffic. SGW 320 may, for example, aggregate traffic received from one or more base stations 315 and may send the aggregated traffic to external network 345 and/or another network via PGW 330. SGW 320 may also aggregate traffic received from external network 345 and/or another network (e.g., via PGW 330) and may send the aggregated traffic to UE 210 via one or more base stations 315.

MME 325 may include one or more computation and communication devices that gather, process, search, store, and/or provide information. For example, MME 325 may perform operations to register UE 210 with the EPS, to establish bearer channels associated with a UE 210, to hand off UE 210 from the EPS to another network, and/or to perform other operations. MME 325 may perform policing operations on traffic destined for and/or received from UE 210.

PGW 330 may include one or more network devices, or other types of computation and communication devices, that gather, process, search, store, and/or provide information in a manner described herein. For example, PGW 330 may include a gateway, a router, a modem, a switch, a firewall, a NIC, a hub, a bridge, a proxy server, an optical add-drop multiplexer ("OADM"), and/or some other type of device that processes and/or transfers traffic. PGW 330 may aggregate traffic received from one or more SGWs 320, and may send the aggregated traffic to external network 345. PGW 330 may also, or alternatively, receive traffic from external network 345 and may send the traffic toward UE 210 via SGW 320, and/or base station 315.

HSS/AAA server 335 may include one or more server devices, or other types of devices, that gather, process, search, store, and/or provide information. For example, HSS/AAA server 335 may manage, update, and/or store, in a memory associated with HSS/AAA server 335, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with UE 210 and/or one or more other UEs 210. Additionally, or alternatively, HSS/AAA server 335 may perform authentication, authorization, and/or accounting operations associated with the subscriber and/or a communication session with UE 210.

PCRF 340 may include one or more server devices, or other types of devices, that aggregate information to and from the EPC network and/or other sources. PCRF 340 may receive information regarding policies and/or subscriptions from one or more sources, such as subscriber databases and/or from one or more users (such as, for example, an administrator associated with PCRF 340).

External network 345 may include one or more wired and/or wireless networks. For example, external network 345 may include a cellular network, a public land mobile network ("PLMN"), a second generation ("2G") network, a third generation ("3G") network, a fourth generation ("4G") network, a fifth generation ("5G") network, and/or another network. Additionally, or alternatively, external network 345 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, some or all of external network 345 may be provided by one or more cellular network providers. That is, in some such implementations, network devices within, or associated with, external network 345, may be provided by the one or more cellular network providers. In some implementations, external network 345 may be communicatively coupled to one or more other networks, such as the Internet.

The quantity of devices and/or networks, illustrated in FIGS. 2 and 3, is provided for explanatory purposes only. In practice, there may be additional devices and/or networks; fewer devices and/or networks; different devices and/or networks; or differently arranged devices and/or networks than illustrated in FIGS. 2 and 3. Alternatively, or additionally, one or more of the devices of environment 200 and/or wireless network 300 may perform one or more functions described as being performed by another one or more of devices. Devices of environment 200 and wireless network 300 may interconnect with each other and/or other devices via wired connections, wireless connections, or a combination of wired and wireless connections.

Figure 4:
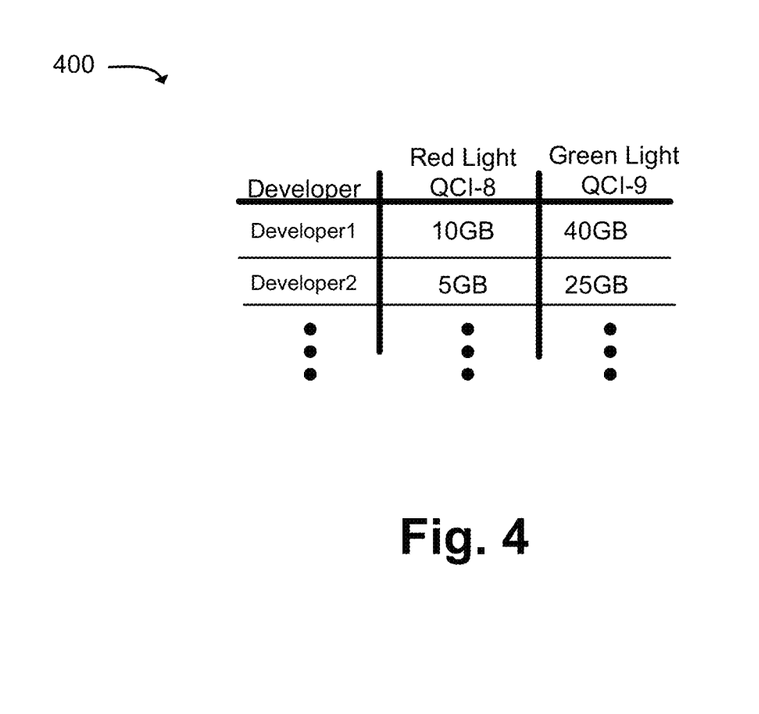
FIG. 4 is a diagram illustrating an example data structure, such as a data structure that may be maintained by a billing server.

FIG. 4 is a diagram illustrating an example data structure 400, such as a data structure that may be maintained by billing server 230. Data structure 400 may generally be used to store network usage information associated with various application developers or distributors. The network usage information may be used to charge application developers or distributors based on the actual data usage of their corresponding applications.

As illustrated, data structure 400 may include an indication of a particular application developer or distributor (the field labeled "developer"), an indication of a total amount of Red Light data used, on the QCI-8 bearer path, by all the applications associated with the developer or distributor (the field labeled "Red Light QCI-8"), and an indication of total amount of Green Light data used, on the QCI-9 bearer path, by all the applications associated with the developer or distributor ("Green Light QCI-9"). In the particular example of FIG. 4, two developers/distributors are illustrated, "developer1" and "developer2". The applications of "Developer1" have used a total of 10 GB of Red Light data and 40 GB of Green Light data. The applications of "Developer2" have used a total of 5 GB of Red Light data and 25 GB of Green Light data.

The fields shown for data structure 400 are examples. In alternative possible implementations, different, fewer, or additional fields may be implemented.

Figure 5:
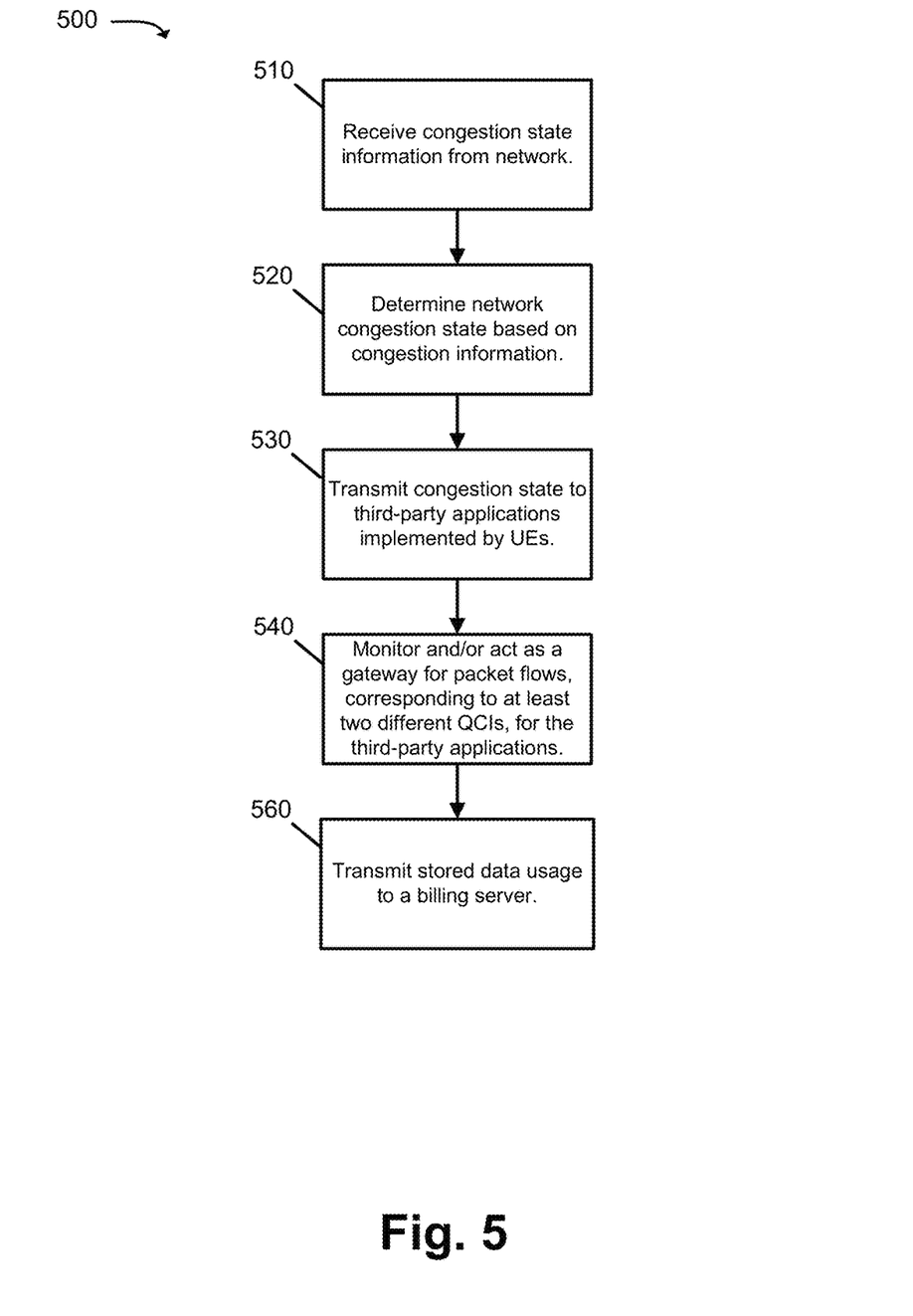
FIG. 5 is a flow chart illustrating an example process relating to the operation of a proxy server.

FIG. 5 is a flow chart illustrating an example process 500 relating to the operation of proxy server 220. Process 500 may include receiving congestion state information from the network (block 510). In one implementation, the congestion state information may include various metrics relating to the operation of one or more network devices associated with network 200. For example, the congestion state information may relate to congestion at cell sites of a cellular network, such as congestion associated with the radio interfaces of the cellular network. In this case, the congestion state information may include information provided by base stations 315, such as a level of congestion of queues or buffers in base stations 350. Alternatively or additionally, the congestion state information may include information relating to congestion at other points in network 240, such as congestion relating to congestion at routers, gateways, or other network devices.

Process 500 may further include determining the network congestion state based on the received congestion state information (block 520). As previously mentioned, in one implementation, the congestion state may be determined as a binary value indicating whether network 240 is currently congestion (e.g., "Red Light") or not congested (e.g., "Green Light"). In one implementation, the "congested" or "not congested" state may be determined on a per-cell site basis and based on an amount of spare radio interface capacity associated with base station 315. In other implementations, additional granularity relating to the indicated network congestion state may be provided. For example, the network congestion state may be provided as three or more possible congestion states, each of which may potentially correspond to different billing rates for different bearer.

Process 500 may further include transmitting the congestion state to third-party applications implemented by UEs (block 530). For example, each third-party application 250 may receive indications of the current congestion state relating to the network or cell site to which the particular third-party application 250 is attached. The congestion state may be periodically or occasionally updated (i.e., be transmitted to third-party application 250), such as whenever there is a change in the congestion state. In this manner, third-party applications 250 may be provided real-time or near real-time information relating to the congestion state of network 240.

Process 500 may further include monitoring and/or acting as a gateway for packet flows, corresponding to at least two different QCIs, for the third-party applications (block 540). As previously mentioned, based on the transmitted congestion state, third-party applications 250 may choose to communicate via packet flows corresponding to different bearer paths, such as QCI-9 bearer path 255 or QCI-8 bearer path 260. Proxy server 220 may monitor the amount of data used by particular third-party applications 250, on the different bearer paths. In this manner, a developer associated with a third-party application 250 may be billed based on data usage corresponding to the bearer path chosen by the third-party application. In some implementations, proxy server 250 may act as a gateway or other forwarding device that may forward data, received from third-party application 250, towards destination devices.

Process 500 may further include transmitting information relating to the amount of data used by particular third-party applications 250, to billing server 230 (block 560). Billing server 230 may subsequently use the data to charge the entity that is paying for the sponsored data. For example, in one implementation, a company may provide software development kits (SDKs) to developers that are developing applications that use sponsored data. Billing server 230 may be a server associated with the telecommunications provider that implements network 240. The telecommunications provider may bill the company that provides the SDK, which may subsequently bill the developers.

In some implementations, instead of proxy server 220 performing the monitoring and the determination of the usage data associated with the packet flows, other devices in network 240 may perform this function. For example, PGW 330 and/or PCRF 340 may perform the functions relating to packet flow monitoring and data usage charging. In this case, proxy server 220 may provide network policy information to PGW 330 and/or PCRF 340, and/or may be implemented as functionality that is included within PGW 330 and/or PCRF 340.

Figure 6:
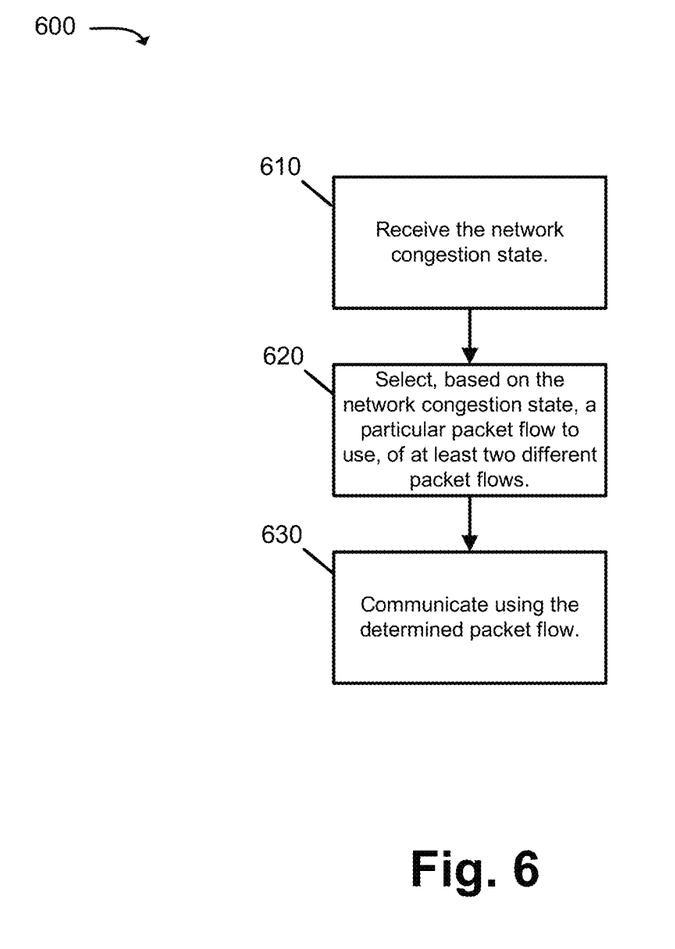
FIG. 6 is a flow chart illustrating an example process relating to the operation of third-party applications.

FIG. 6 is a flow chart illustrating an example process 600 relating to the operation of third-party applications 250. Process 600 may be implemented, for example, by one or more UEs 210.

Process 600 may include receiving the network congestion state (block 610). The network congestion state may be received from, for example, proxy server 210, billing server 230, and/or another device associated with network 240.

Process 600 may further include, based on the received network congestion state, selecting a particular packet flow to use (block 620). The determination may be based on third-party application 250 choosing between at least two different packet flows (block 620). For example, the developer of third-party application 250, when code logic into third-party application to determine how various data generated by third-party application 250 should be transmitted. The developer may use the supplied SDK to implement the data transmission. The at least two different packet flows may have differing quality of service parameters (e.g., be of different QCI levels) and/or be associated with different billing rates. In some implementations, the different billing rates, associated with the different packet flows, may also be received. As previously mentioned, in one implementation, the two different packet flows may include packet flows associated with a QCI-9 bearer path and a QCI-8 bearer path, and the network congestion state may be provided as a binary value that indicates whether the network is congested (e.g., "Green Light" congestion state or "Red Light" congestion state).

Process 600 may further include communicating using the determined packet flow (block 630). That is, third-party application 250 may communicate with other UEs or other network devices (e.g., web servers or other servers in external network 345) using the selected packet flows. In this manner, third-party application 250 may intelligently select a packet flow to use, for sponsored data, based on the current network congestion state.

Figure 7:
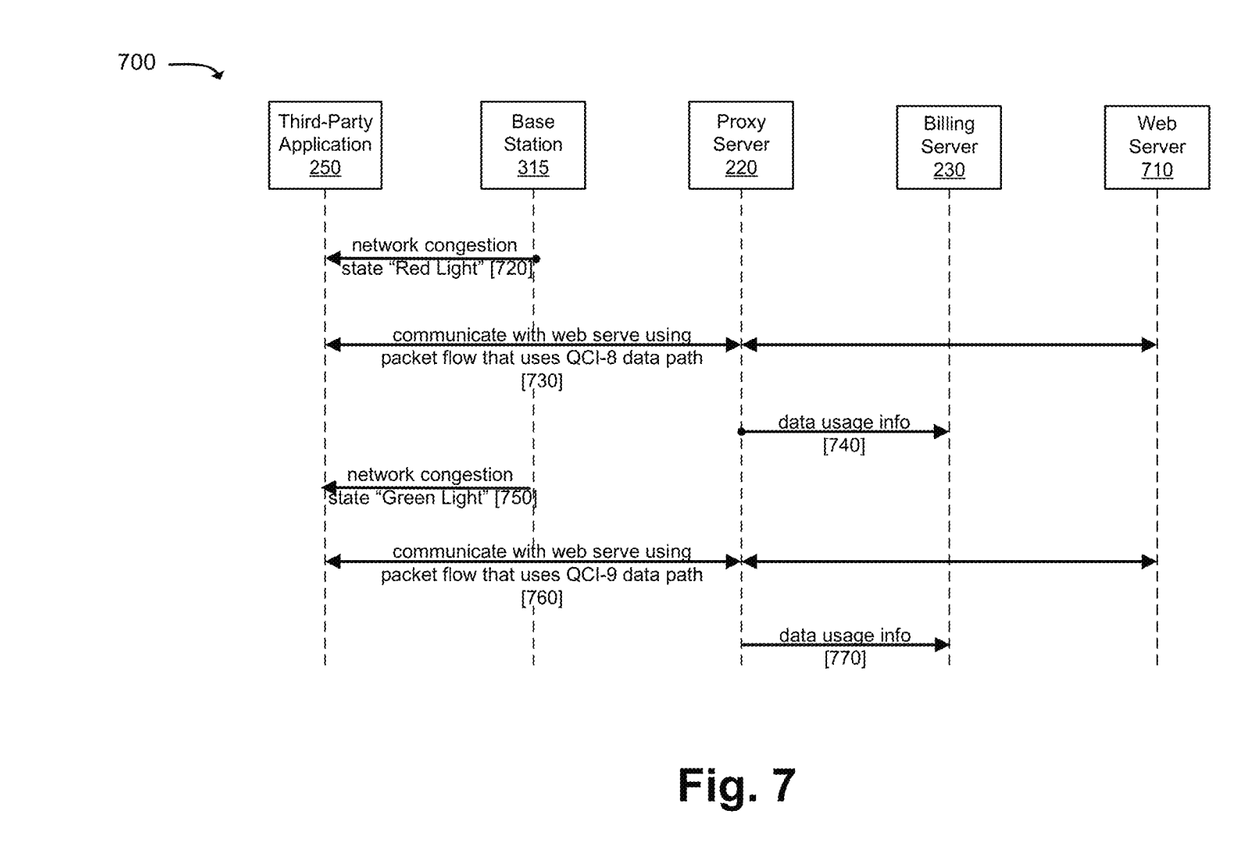
FIG. 7 is a diagram illustrating example signal flows of example application, consistent with aspects described herein.

FIG. 7 is a diagram illustrating example signal flows illustrating one example application, consistent with aspects described herein, associated with the providing of network congestion information to applications that use sponsored data. In FIG. 7, assume that third-party application 250 communicates with a web server 710. Further, assume that the network congestion information relates to network congestion associated with the cell site to which the UE, that executes third-party application 250, attaches.

As illustrated, third-party application 250 may receive the network congestion state, such as whether the current network congestion is "red light" or "green light". In this example, assume that the congestion state is indicated as "red light" (at 720). Based on this information, third-party application 250 may select the packet flow corresponding to the QCI-8 bearer path and communicate with web server 710 (at 730). Thus, third-party application 250 may choose to transmit/receive data despite the network congestion state being "red light." Data transmitted on the QCI-8 bearer path may be charged, by the operator of network 240, at a rate greater than data transmitted on a lower priority bearer path (e.g., a QCI-9 bearer path).

The QCI-8 bearer path may be monitored or forwarded by proxy server 220. At some point, proxy server 220 may forward data usage information, relating to third party application 250, to billing server 230 (at 740). Billing server 230 may aggregate usage information from a number of proxy servers 220 and may be responsible for charging for the used data.

At some point, assume that the network congestion state changes to the "green light" state. Base station 315 may transmit the updated network congestion state to third-party application 250 (at 750). Based on this information, third-party application 250 may select the packet flow corresponding to the QCI-9 bearer path and may continue to communicate with web server 710 (at 760). Data transmitted on the QCI-9 bearer path may be charged, by the operator of network 240, at a rate lower than the data transmitted on the higher priority bearer path (e.g., the QCI-8 bearer path). Proxy server 220 may forward data usage information, relating to third party application 250, to billing server 230 (at 770).

Figure 8:
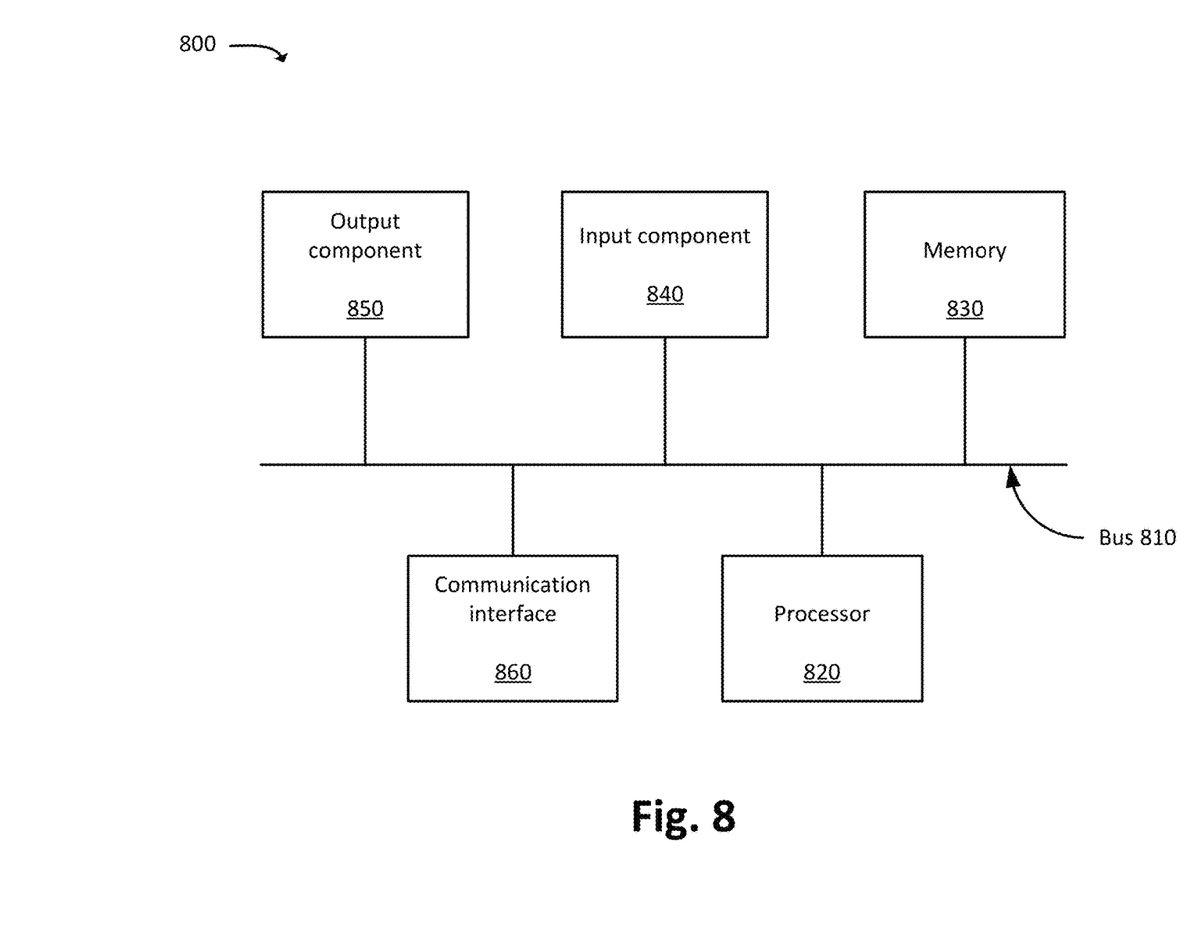
FIG. 8 is a diagram of example components of a device.

FIG. 8 is a diagram of example components of device 800. One or more of the devices described above (e.g., with respect to illustrated in FIGS. 1, 2, 3 and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 6, the order of the blocks may be modified in other implementations. Further, non-dependent blocks may be performed in parallel.

Additionally, while examples of data structures are illustrated in FIG. 4 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   transmitting, by one or more network devices and to a third-party application being executed by user equipment (UE), information regarding a congestion state relating to congestion associated with a network;
   receiving, by the one or more network devices and from the third-party application, data associated with a data flow, the data flow being associated with a bearer path that is selected, by the third-party application and based on the information regarding the congestion state, from a plurality of bearer paths, each of the plurality of bearer paths being associated with different Quality of Service (QoS) parameters, wherein the one or more devices provide proxy connectivity between the third-party application and a destination device associated with the data flow, and wherein the plurality of bearer paths include a first bearer path associated with a first QoS traffic class and a second bearer path associated with a second QoS traffic class, the second QoS traffic class being of higher priority than the first QoS traffic class;

providing the UE with charging information relating to a billing rate associated with the bearer path associated with the first traffic class and the bearer path associated with the second traffic class; and storing usage information relating to an amount of data used by the data flow associated with the selected bearer path.

2. The method of claim 1, wherein the first QoS traffic class is QoS scavenger class traffic and the second QoS traffic class is QoS best effort class traffic.

3. The method of claim 1, wherein a billing rate for the scavenger class traffic is less than a billing rate for the best effort class traffic.

4. The method of claim 1, further comprising:
billing an entity associated with the third-party application, based on the stored usage information, for data associated with the data flow.

5. The method of claim 1, wherein the information regarding the congestion state relates to congestion associated with a radio interface of a wireless cellular network.

6. The method of claim 5, wherein the information regarding the congestion state is transmitted as a binary value indicating whether the network is congested or not congested.

7. A system, comprising:
a non-transitory memory device a set of computer-executable instructions; and
one or more processors configured to execute the computer-executable instructions, wherein executing the computer-executable instructions causes the one or more processors to:
transmit, to a third-party application being executed by user equipment (UE), information regarding a congestion state relating to congestion associated with a network;
receive, from the third-party application, data associated with a data flow, the data flow being associated with a bearer path that is selected, by the third-party application and based on the information regarding the congestion state, from a plurality of bearer paths, each of the plurality of bearer paths being associated with different Quality of Service (QoS) parameters, wherein the one or more devices provide proxy connectivity between the third-party application and a destination device associated with the data flow, and wherein the plurality of bearer paths include a first bearer path associated with a first QoS traffic class and a second bearer path associated with a second QoS traffic class, the second QoS traffic class being of higher priority than the first QoS traffic class;
provide the UE with charging information relating to a billing rate associated with the bearer path associated with the first traffic class and the bearer path associated with the second traffic class;
store usage information relating to an amount of data used by the data flow associated with the selected bearer path.

8. The system of claim 7, wherein the first QoS traffic class is QoS scavenger class traffic and the second QoS traffic class is QoS best effort class traffic.

9. The system of claim 7, wherein a billing rate for the scavenger class traffic is less than a billing rate for the best effort class traffic.

10. The system of claim 7, wherein the non-transitory memory device further includes instructions, that when executed by the one or more processors, further causes the one or more processors to:
bill an entity associated with the third-party application, based on the stored usage information, for data associated with the data flow.

11. The system of claim 7, wherein the information regarding the congestion state relates to congestion associated with a radio interface of a wireless cellular network.

12. The system of claim 11, wherein the information regarding the congestion state is transmitted as a binary value indicating whether the network is congested or not congested.

13. A method comprising:
receiving, by user equipment (UE), information regarding a congestion state relating to congestion of a network;
selecting, by the UE and based on the information regarding the congestion state, a data flow, from a plurality of data flows, to use when communicating with a destination device, each of the plurality of data flows being associated with different quality of service (QoS) parameters and being associated with different charging rates, wherein the plurality of data flows include a first data flow associated with a first QoS traffic class and a second data flow associated with a second QoS traffic class, the second QoS traffic class being of higher priority than the first QoS traffic class, and wherein the different charging rates are received by the UE as charging information relating to a billing rate associated with the first data flow associated with the first traffic class and the second data flow associated with the second traffic class; and
communicating, by the UE, through a proxy server, and using the selected data flow, with the destination device, the communication with the destination device being performed using sponsored data that is not charged to an account associated with an owner of the UE.

14. The method of claim 13, wherein the first data flow is QoS scavenger class traffic and the second data flow is QoS best effort class traffic.

15. The method of claim 14, further comprising:
receiving charging information relating to billing rates associated with the first data flow and the second data flow.

16. The method of claim 13, wherein the selection is performed by a third-party application installed at the UE.

17. The method of claim 13, wherein the information regarding the congestion state relates to congestion associated with a radio interface of a wireless cellular network.

18. The method of claim 17, wherein the information regarding the congestion state is transmitted as a binary value indicating whether the network is congested or not congested.

* * * * *